United States Patent
Wang et al.

(10) Patent No.: US 8,203,362 B2
(45) Date of Patent: Jun. 19, 2012

(54) ADJUSTABLE FINITE IMPULSE RESPONSE TRANSMITTER

(75) Inventors: Charles Wang, Los Altos, CA (US); Karen Tucker, Ft. Collins, CO (US)

(73) Assignee: Advanced Micro Devices, Inc., Austin, TX (US)

(*) Notice: Subject to any disclaimer, the term of this patent is extended or adjusted under 35 U.S.C. 154(b) by 4 days.

(21) Appl. No.: 12/857,225

(22) Filed: Aug. 16, 2010

(65) Prior Publication Data

US 2012/0042104 A1 Feb. 16, 2012

(51) Int. Cl.
*H03K 19/00* (2006.01)

(52) U.S. Cl. .......................... 326/93; 375/232

(58) Field of Classification Search .............. 326/93; 375/229–236
See application file for complete search history.

(56) References Cited

U.S. PATENT DOCUMENTS

| | | | | |
|---|---|---|---|---|
| 5,483,552 A * | 1/1996 | Shimazaki et al. | ............ | 375/233 |
| 6,532,273 B1 * | 3/2003 | Mobin et al. | ................ | 375/350 |
| 6,567,489 B1 * | 5/2003 | Glover | ............................ | 375/376 |
| 7,184,478 B2 * | 2/2007 | Popescu et al. | ................ | 375/233 |
| 7,205,791 B1 * | 4/2007 | Lee et al. | .......................... | 326/41 |
| 7,483,420 B1 * | 1/2009 | Esposito | ......................... | 370/371 |
| 2002/0083109 A1 * | 6/2002 | Willson et al. | ................. | 708/700 |
| 2003/0097601 A1 * | 5/2003 | Glas et al. | ...................... | 713/401 |
| 2004/0012433 A1 * | 1/2004 | Kim et al. | ...................... | 327/350 |
| 2004/0196085 A1 * | 10/2004 | Shen | ............................... | 327/277 |
| 2004/0218756 A1 * | 11/2004 | Tang et al. | ...................... | 379/417 |
| 2006/0188043 A1 * | 8/2006 | Zerbe et al. | .................... | 375/346 |
| 2007/0064923 A1 * | 3/2007 | Schmukler et al. | ......... | 379/406.1 |

* cited by examiner

*Primary Examiner* — Jason M Crawford
(74) *Attorney, Agent, or Firm* — Ingrassia Fisher & Lorenz, P.C.

(57) ABSTRACT

Apparatus and methods are provided for generating output signals representative of bits of serial data. A transmitter comprises a plurality of delay elements, driver circuitry, and bypass logic coupled between the plurality of delay elements and the driver circuitry. The plurality of delay elements delay serialized data, resulting in delayed serialized data, and the driver circuitry generates an output signal representative of a first bit of the delayed serialized data. The bypass logic is configured to selectively bypass one or more delay elements of the plurality of delay elements to provide the first bit of the delayed serialized data to the driver circuitry.

14 Claims, 3 Drawing Sheets

ADJUSTABLE FINITE IMPULSE RESPONSE TRANSMITTER

TECHNICAL FIELD

Embodiments of the subject matter described herein relate generally to electronic circuits, and more particularly, embodiments of the subject matter relate to transmitters and related transmitter circuitry having adjustable latency and adjustable equalization.

BACKGROUND

Many modern electronic devices include multiple processors (e.g., data processors, graphics processors, signal processors, and the like) that cooperate to perform various tasks, functions, or operations. Frequently, data or information must be communicated from one processor to a second processor to enable the second processor to complete a particular task, function, or operation. Any latency in communicating the data decreases throughput and impairs the ability of the second processor to complete the particular task, function, or operation in a timely manner.

BRIEF SUMMARY

In an exemplary embodiment, an apparatus for a computing module is provided. The computing module comprises a processing system and a finite impulse response (FIR) transmitter coupled to the processing system. The FIR transmitter transmits an output signal representative of a first bit of data from the processing system over a serial interface. The FIR transmitter is capable of selectively equalizing the output signal using another bit of the data.

In accordance with an exemplary embodiment, a transmitter comprises a plurality of delay elements, driver circuitry, and bypass logic coupled between the plurality of delay elements and the driver circuitry. The plurality of delay elements delay serialized data, resulting in delayed serialized data, and the driver circuitry generates an output signal representative of a first bit of the delayed serialized data. The bypass logic is configured to selectively bypass one or more delay elements of the plurality of delay elements to provide the first bit of the delayed serialized data to the driver circuitry.

In another embodiment, a method is provided for generating output signals representative of bits of serial data. The method comprises generating an equalized output signal representative of a first bit of the serial data at an output node by filtering the first bit and a second bit of the serial data. When a performance metric for an interface coupled to the output node satisfies a threshold criterion, a second output signal representative of a third bit is generated at the output node, wherein the second output signal is not filtered by a fourth bit of the serial data. In one embodiment, the second bit follows the first bit and the fourth bit follows the third bit.

This summary is provided to introduce a selection of concepts in a simplified form that are further described in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Technologies and concepts discussed herein relate to finite impulse response (FIR) equalization transmitters and related circuitry having adjustable latency and adjustable equalization. As used herein, a FIR equalization transmitter should be understood as referring to a transmitter that generates an output signal at an output node (or output port) that is representative of a particular bit (the main bit) of data by filtering or otherwise equalizing the signal using preceding and/or succeeding bits of the data. In this regard, the preceding and/or succeeding bits of data are used to equalize (or filter) the output signal to compensate for downstream deficiencies of the communication channel coupled to the output node (or output port). For example, the output signal may be equalized or filtered to compensate for noise, distortion, attenuation, or other performance characteristics of the communication channel (e.g., a bus or another suitable serial interface) coupled to the output node. As described in greater detail below, in an exemplary embodiment, the FIR equalization transmitter is capable of selectively bypassing one or more delay elements used to provide the main bit and preceding and/or succeeding bits to obtain the main bit used to generate the output signal, to reduce the latency of the transmitter and selectively equalize the output signal using a fewer number of preceding and/or succeeding bits.

Figure 1:
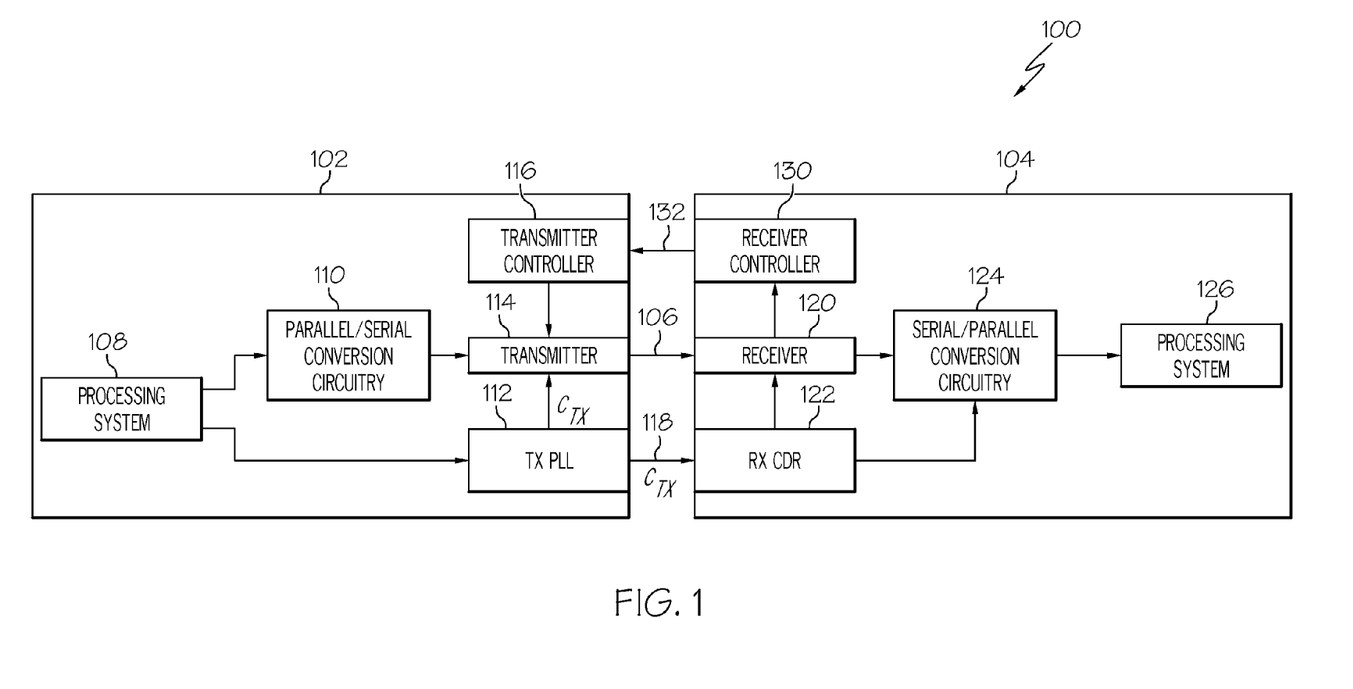
FIG. 1 is a block diagram of a system for communicating between two computing modules in accordance with one embodiment.

FIG. 1 depicts an exemplary embodiment of a system 100 for communicating data over a serial interface 106 from a first computing module 102, such as a processor, central processing unit (CPU), graphics processing unit (GPU), or the like, to a second computing module 104 (e.g., another processor, CPU, GPU, or the like). The serial interface 106 represents the physical communication channel between the computing modules 102, 104, and depending on the embodiment, the serial interface 106 may be realized as a bus, wire, conductive trace, pin, another suitable interconnection and/or a suitable combination thereof. It should be understood that FIG. 1 is a simplified representation of the system 100 for purposes of explanation and ease of description, and FIG. 1 is not intended to limit the subject matter in any way. Practical embodiments may include other devices and components for providing additional functions and features, and/or the computing modules 102, 104 may be part of a larger system, as will be understood. In this regard, it should be understood that although the subject matter may be described in the context of communicating data from the first computing module 102 to the second computing module 104, the subject matter may be implemented in a like manner for communicating data from the second computing module 104 to the first computing module 102 or for communicating data to other modules not illustrated in FIG. 1, and in some embodiments, the serial interface 106 may be utilized for bidirectional communication between computing modules 102, 104. Furthermore, although FIG. 1 depicts the computing modules 102, 104 as distinct elements (e.g., separate chips and/or device packages), in some embodiments, the computing modules 102, 104 may be implemented as part of a common device package.

In an exemplary embodiment, the first computing module 102 includes, without limitation, a processing system 108, parallel-to-serial conversion circuitry 110, a transmitter phase-locked loop (PLL) 112, a transmitter 114 configured to communicate data over the serial interface 106, and a transmitter controller 116. The processing system 108 generally represents the main processing core for the first computing module 102. In various embodiments, the processing system 108 may be realized using one or more arithmetic logic units (ALUs), one or more floating point units (FPUs), one or more memory elements (e.g., one or more caches), discrete gate or transistor logic, discrete hardware components, or any combination thereof. The processing system 108 is coupled to the parallel-to-serial conversion circuitry 110 and generates or otherwise provides parallelized (or multi-bit) data to be transmitted to the second computing module 104, and provides the parallel data to the parallel-to-serial conversion circuitry 110. The parallel-to-serial conversion circuitry 110 is coupled between the processing system 108 and the transmitter 114, and the parallel-to-serial conversion circuitry 110 generally represents the hardware components that are configured to convert parallel data from the processing system 108 to serialized data capable of being transmitted or otherwise communicated over interface 106. The processing system 108 is also coupled to the transmitter PLL 112 and generates or otherwise provides a reference clock signal that is used by the transmitter PLL 112 to generate a transmit clock signal for synchronizing the data being transmitted over the serial interface 106.

In the illustrated embodiment, the transmitter PLL 112 is coupled to the transmitter 114, and based on the reference clock signal received from the processing system 108, the transmitter PLL 112 generates the transmit clock signal ($C_{TX}$) that is used by the transmitter 114 to transmit data over the serial interface 106 in sync with the transmit clock signal ($C_{TX}$). In an exemplary embodiment, the frequency of the transmit clock signal ($C_{TX}$) is greater than 200 MHz, and is typically within the range of about 1 GHz to about 8 GHz. The illustrated embodiment of FIG. 1 depicts a source-synchronous system, wherein the transmitter PLL 112 is also coupled to a second serial interface 118 and configured to communicate the transmit clock signal ($C_{TX}$) over the second serial interface 118 to the second computing module 104 to support source-synchronous communications between computing modules 102, 104.

The transmitter 114 generally represents the hardware components and/or circuitry of the first computing module 102 that are configured to sequentially transmit electrical signals representative of individual bits of the serialized data from the output of parallel-to-serial conversion circuitry 110 over the serial interface 106 in sync with the leading and/or falling edges of the transmit clock signal ($C_{TX}$) received from the transmitter PLL 112, as described in greater detail below. In an exemplary embodiment, the transmitter 114 is realized as a FIR equalization transmitter configured to equalize the electrical signal representative of a respective bit of the serial data based on performance characteristics (e.g., noise, distortion, attenuation, and the like) of the serial interface 106 utilizing preceding and/or succeeding bits of the serial data. As described in greater detail below, in an exemplary embodiment, the transmitter 114 is configured to selectively equalize the signal being transmitted over the serial interface 106. In this regard, the transmitter controller 116 generally represents the hardware, firmware, processing logic and/or software (or a combination thereof) that is coupled to the transmitter 114 and configured to control the manner in which the transmitter 114 generates the signal being transferred over the serial interface 106, as described in greater detail below. It should be noted that although the transmitter controller 116 is depicted as a distinct element of the first computing module 102, in practice, the features and/or functionality of the transmitter controller 116 may be implemented by the processing system 108 or the transmitter controller 116 may be otherwise integrated with the processing system 108.

In the illustrated embodiment, the second computing module 104 includes, without limitation, receiver 120 for communicating data over the serial interface 106, a receiver clock and data recovery (CDR) module 122, serial-to-parallel conversion circuitry 124, a second processing system 126, and a receiver controller 130. As illustrated in FIG. 1, the CDR module 122 is coupled to the serial interface 118 and receives the transmit clock signal ($C_{TX}$) generated by the transmitter PLL 112. In an exemplary embodiment, the CDR module 122 removes high frequency jitter and/or distortion from the signal received from the serial interface 118 and provides a cleaned-up clock signal that is aligned with the data being transmitted over the serial interface 106 to the receiver 120. In an exemplary embodiment, the receiver 120 is coupled to the CDR module 122 and generally represents the hardware components and/or circuitry of the second computing module 104 that are coupled to the serial interface 106 and configured to convert electrical signals on the serial interface 106 to serialized digital values that are in sync with leading and/or falling edges of the cleaned-up clock signal received from the CDR module 122. The serial-to-parallel conversion circuitry 124 is coupled to the output of the receiver 120 and the output of the CDR module 122, and the serial-to-parallel conversion circuitry 124 generally represents the hardware components of computing modules 104 that are configured to convert the serialized data from the receiver 120 that are synchronized with the transmit clock signal ($C_{TX}$) to parallel data that is synchronized with the clock domain of the processing system 126. The processing system 126 generally represents the main processing core for the second computing module 104, and the processing system 126 is coupled to the output of the serial-to-parallel conversion circuitry 124 and configured to receive and/or act upon the data from the serial-to-parallel conversion circuitry 124 in a conventional manner. Depending on the embodiment, the processing system 126 may be realized using one or more ALUs, one or more FPUs, one or more memory elements, discrete gate or transistor logic, discrete hardware components, or any combination thereof.

In the illustrated embodiment, the receiver controller 130 generally represents the hardware, firmware, processing logic and/or software (or a combination thereof) that is coupled to the receiver 120 and configured to monitor the signals received by receiver 120 over the serial interface 106 and determine one or more performance metrics (or figures of merit) for the serial interface 106 based on the received signals. For example, the receiver controller 130 may determine one or more performance metrics for the serial interface 106 that corresponds to the noise of the serial interface 106, distortion of the serial interface 106, attenuation of the serial interface 106, a bit error rate for the serial interface 106 and/or a voltage margin at the input of the receiver 120. It should be noted that although the receiver controller 130 is depicted as a distinct element of the second computing module 104, in practice, the features and/or functionality of the receiver controller 130 may be implemented by the processing system 126 or the receiver controller 130 may be otherwise integrated with the processing system 126. In an exemplary embodiment, the receiver controller 130 is coupled to a third serial interface 132 and is configured to transmit or otherwise communicate the performance metric(s) for the serial interface 106 to the transmitter controller 116. As described in greater detail below, in an exemplary embodiment, when the performance metric(s) satisfy corresponding threshold criteria, the transmitter controller 116 is configured to control the transmitter 114 such that the transmitter 114 selectively equalizes the output signals using fewer bits of the serial data or avoids equalizing the output signal altogether in a manner that saves power and/or reduces latency.

Figure 2:
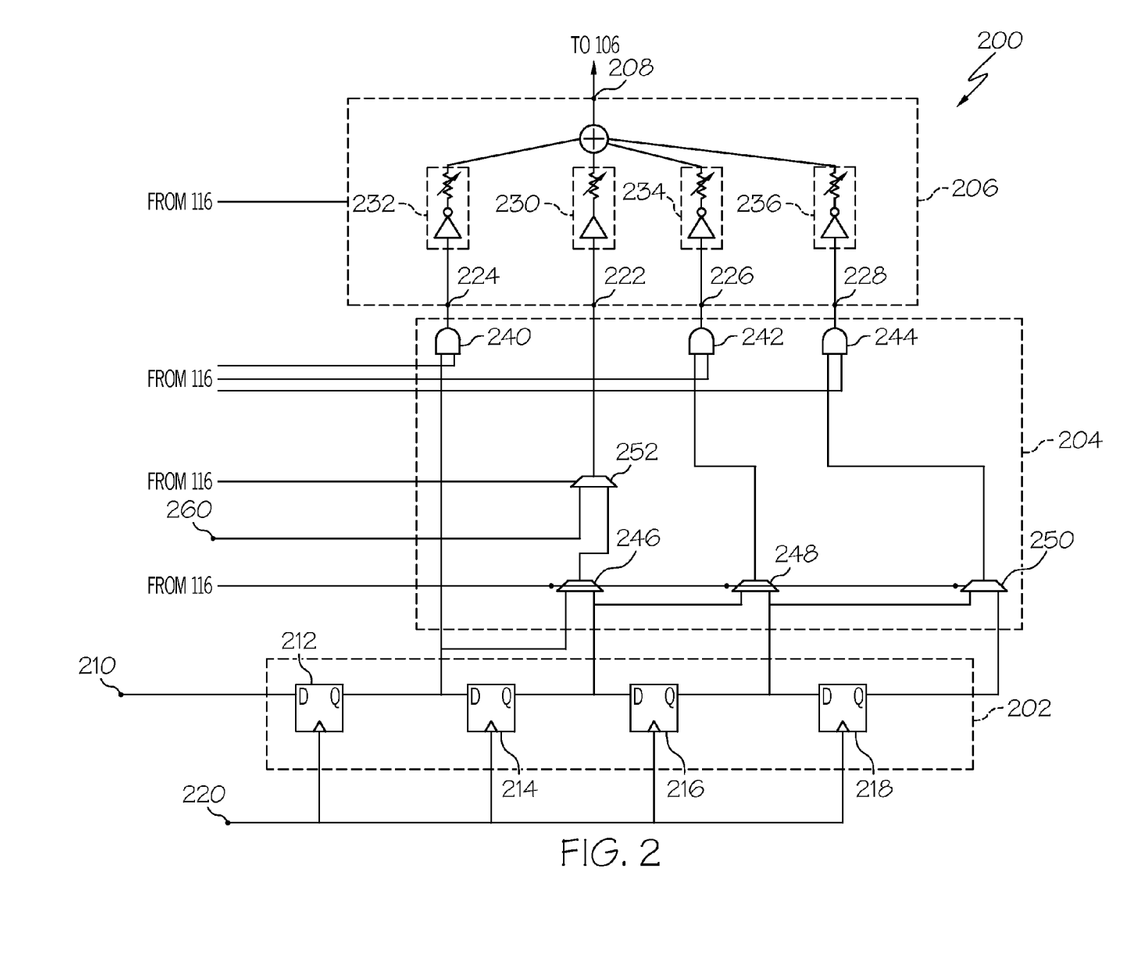
FIG. 2 is a schematic view of transmitter circuitry suitable for use in the system of FIG. 1 in accordance with one embodiment.

FIG. 2 depicts an exemplary embodiment of transmitter circuitry 200 suitable for use as the transmitter 114 in the first computing module 102 of FIG. 1. The illustrated embodiment of the transmitter circuitry 200 includes, without limitation, a serialized delay arrangement 202, bypass logic 204, and driver circuitry 206. The elements of the transmitter circuitry 200 are suitably configured to produce an output data signal at an output node 208 that corresponds to a bit of serialized data received at an input node 210. In this regard, the output data signal is an electrical signal representative of a particular bit of serialized data, and as described in greater detail below, the transmitter circuitry 200 is configured to selectively equalize, filter, or otherwise modify the electrical signal at the output node 208 utilizing preceding and/or succeeding bits of the serialized data. In an exemplary embodiment, when the transmitter circuitry 200 is utilized as the transmitter 114 in the first computing module 102 of FIG. 1, the input node 210 is coupled to or otherwise configured to receive serialized data from the output of the parallel-to-serial conversion circuitry 110 and the output node 208 is coupled to the serial interface 106. In this regard, the driver circuitry 206 utilizes preceding and/or succeeding bits of the serialized data selectively provided to the driver circuitry 206 by the bypass logic 204 to filter or otherwise equalize the output data signal based on characteristics and/or performance metrics of the serial interface 106, as described in greater detail below.

In an exemplary embodiment, the serialized delay arrangement 202 comprises a plurality of serialized delay elements 212, 214, 216, 218 configured to delay a stream of serialized data at the input node 210. In this regard, input of a first delay element 212 is coupled to or otherwise configured to receive the serial data at the input node 210, the input of the second delay element 214 is coupled to or otherwise configured to receive the output of the first delay element 212, the input of the third delay element 216 is coupled to or otherwise configured to receive the output of the second delay element 214, and the input of the fourth delay element 218 is coupled to or otherwise configured to receive the output of the third delay element 216. In an exemplary embodiment, the delay elements 212, 214, 216, 218 are each realized as flip-flops that are clocked by a clock signal at node 220, that is, the clock input of each delay element 212, 214, 216, 218 is coupled to node 220 as shown. In the illustrated embodiment, the clock signal at node 220 corresponds to bit rate clock signal, wherein the rising edge of the clock signal is synchronized with a respective bit of the serial data at the input node 210, such that bits of the serial data at the input node 210 propagate through delay elements 212, 214, 216, 218 at the bit rate. When the transmitter circuitry 200 is used as the transmitter 114 of FIG. 1, the clock node 220 is coupled to or otherwise configured to receive the transmit clock signal ($C_{TX}$) from the transmitter PLL 112.

In the illustrated embodiment, in a normal operating mode, the output of the second delay element 214 corresponds to the bit that is being represented by the electrical signal at the output node 208, that is, the bit of the serialized data being transmitted by the transmitter circuitry 200 during the current period of the clock signal at node 220. As used herein, the main data bit should be understood as referring to the bit being transmitted by the transmitter circuitry 200 or is otherwise being represented by the electrical signal at the output node 208 during the current period of the clock signal at node 220. In this regard, the output of the third delay element 216 corresponds to the bit of the serial data that was transmitted by the transmitter circuitry 200 during the previous transmission interval (e.g., the main data bit during a preceding period of the clock signal), and the output of the fourth delay element 218 corresponds to the bit of the serial data that was transmitted by the transmitter circuitry 200 two transmission intervals prior to the current transmission interval. Similarly, the output of the first delay element 212 corresponds to the bit of the serial data that will be transmitted by the transmitter circuitry 200 during the subsequent transmission interval (e.g., after the next rising edge of the clock signal). For convenience, but without limitation, the output of the first delay element 212 may alternatively be referred to herein as the precursor data bit and the outputs of the third and fourth delay elements 216, 218 may alternatively be referred to herein as postcursor data bits. In this regard, in the serialized data, a precursor data bit follows or succeeds a main data bit and a postcursor data bit precedes the main data bit. It should be appreciated that although FIG. 2 depicts the serialized delay arrangement 202 having four delay elements 212, 214, 216, 218, practical embodiments of the transmitter circuitry 200 may utilize any number of delay elements for the serialized delay arrangement 202.

In an exemplary embodiment, the driver circuitry 206 is configured as a 4-bit FIR filter that generates the output data signal at output node 208 that is representative of the signal at driver input node 222 in a manner that is influenced by signals at driver input nodes 224, 226, 228. In this regard, the first driver input node 222 is configured to receive the main data bit, the second driver input node 224 is configured to receive the precursor data bit, and the third and fourth driver input nodes 226, 228 are configured to receive a respective postcursor data bit. As described in greater detail below, each driver input node 222, 224, 226, 228 is coupled to the bypass logic 204 which selectively provides the precursor data bit, the postcursor data bits and/or main data bit to the respective driver input node 222, 224, 226, 228.

As illustrated in FIG. 2, the driver circuitry 206 includes a first variable gain amplifier arrangement 230 coupled between the main data bit node 222 and the output node 208, a second variable gain amplifier arrangement 232 coupled between the precursor data bit node 224 and the output node 208, a third variable gain amplifier arrangement 234 coupled between the first postcursor data bit node 226 and the output node 208, and a fourth variable gain amplifier arrangement 236 coupled between the second postcursor data bit node 228 and the output node 208. The outputs of the variable gain amplifier arrangements 230, 232, 234, 236 are summed at the output node 208 to generate the output data signal, wherein the gains of the respective variable gain amplifier arrangements 230, 232, 234, 236 are chosen to generate the output data signal in a manner that achieve desired equalization of the communication channel (e.g., serial interface 106) coupled to the output node 208. In this manner, the driver circuitry 206 filters or otherwise equalizes the main data bit at driver input node 222 with the precursor and postcursor bits at nodes 224, 226, 228. In an exemplary embodiment, the variable gain amplifier arrangements 230, 232, 234, 236 are coupled to the transmitter controller 116 which controls the gain of each respective variable gain amplifier arrangement 230, 232, 234, 236 (e.g., by controlling the resistance of one or more variable resistance elements) to achieve particular performance metric (or figure of merit) at the input of the receiver 120. In some embodiments, one or more of the variable gain arrangements 230, 232, 234, 236 may be realized using logic gates (e.g., exclusive-OR gates) to allow the transmitter controller 116 to adjust or otherwise control the sign of each respective variable gain amplifier arrangement 230, 232, 234, 236, as illustrated and described in the context of FIG. 3.

In an exemplary embodiment, the bypass logic 204 is coupled between the outputs of the delay elements 212, 214, 216, 218 and the driver input nodes 222, 224, 226, 228 and is configured to selectively provide one or more of the precursor data bit, the postcursor data bits and/or main data bit to the driver circuitry 206 during operation of the transmitter circuitry 200. The bypass logic 204 includes logic gates 240, 242, 244 for enabling and/or disabling a respective precursor data bit and/or postcursor data bit. The bypass logic 204 also includes an array of multiplexers 246, 248, 250 for selectively bypassing one or more delay elements of the serialized delay arrangement 202. In accordance with one embodiment, the bypass logic 204 also includes a multiplexer 252 configured to bypass the serialized delay arrangement 202 to provide the main data bit to the driver input node 222, as described in greater detail below.

Referring now to FIGS. 1 and 2, in an exemplary embodiment, in a normal operating mode, the bypass logic 204 provides the main data bit, the precursor data bit, and the postcursor data bits to the driver circuitry 206 for generating an output data signal representative of the main data bit that equalizes the communication channel at the output node 208. In this regard, the transmitter controller 116 provides signals to control the multiplexers 246, 248, 250, 252, such that mutliplexers 246 and 250 provide the output of the second delay element 214 to the input of the main data bit node 222, mutliplexer 248 provides the output of the third delay element 216 to an input of logic gate 242, and mutliplexer 250 provides the output of the fourth delay element 218 to an input of logic gate 244, while the output of the first delay element 212 is coupled to an input of logic gate 240. The transmitter controller 116 also provides logical high signals (e.g., logic '1') to the other inputs of the AND logic gates 240, 242, 244 to provide the precursor bit and postcursor bits to the driver input nodes 224, 226, 228. The driver circuitry 206 generates the output data signal at the output node 208 representative of the main data bit (e.g., the output of the second delay element 214) in a manner that is influenced by the precursor data bit and postcursor data bits to achieve a desired equalization of the communication channel coupled to the output node 208, as described above.

In an exemplary embodiment, in one operating mode, alternatively referred to as the precursor bypass mode, the transmitter controller 116 provides signals to the transmitter circuitry 200 to disable the use of the precursor bit when generating the output data signal at node 208. In the precursor bypass mode, the main data bit corresponds to the output of the first delay element 212 and the postcursor bits correspond to the respective outputs of the second and third delay elements 214, 216. In other words, the second delay element 214 is bypassed to obtain the main data bit, the third delay element 216 is bypassed to obtain the first postcursor data bit, and the fourth delay element 218 is bypassed to obtain the second postcursor data bit. For example, in response to determining a performance metric of the serial interface 106 satisfies a threshold criterion (e.g., a bit error rate for the serial interface 106 is below a threshold value), the transmitter controller 116 provides signals to control the multiplexers 246, 248, 250, 252, such that mutliplexers 246 and 252 provide the output of the first delay element 212 to the input of the main data bit node 222, mutliplexer 248 provides the output of the second delay element 214 to an input of logic gate 242, and mutliplexer 250 provides the output of the third delay element 216 to an input of logic gate 244. The transmitter controller 116 also sets the gain of the variable gain amplifier arrangement 232 to zero (e.g., to disable the output of the variable gain amplifier arrangement 232 at node 208) and provides a logical low (or logic '0') signal to an input of AND logic gate 240 to effectively disable the precursor bit at node 224 (e.g., by producing a logical low voltage at node 224). In this manner, the variable gain amplifier arrangement 232 is effectively disabled, thereby reducing the power consumed by the driver circuitry 206. The transmitter controller 116 provides logical high signals to the inputs of the AND logic gates 242, 244 to provide the postcursor bits to the driver input nodes 226, 228. In another embodiment, the receiver controller 130 and/or transmitter controller 116 may analyze the eye pattern for the serial data at the input of the receiver 120 to determine whether the voltage and/or timing margins for the serial data at the input of the receiver 120 satisfy particular requirements for the system 100, and in response to determining that the voltage and/or timing margins are adequate, the transmitter controller 116 may identify the precursor bypass mode as the desired operating mode and provide signals to control the multiplexers 246, 248, 250, 252 as set forth above. In other embodiments, the receiver 120 may include equalization capabilities that are capable of achieving a desired performance metric at the input of the receiver 120 or the precursor data bit may not be utilized in the protocol being used to communicate over the serial interface 106, wherein the receiver controller 130 and/or processing system 108 may signal the transmitter controller 116 to implement the precursor bypass mode when the receiver 120 includes an equalizer capable of achieving the desired performance metric(s) or the communication protocol does not require the use of precursor data bits.

In the precursor bypass mode, the driver circuitry 206 generates the output data signal at the output node 208 representative of the main data bit (e.g., the output of the first delay element 212) in a manner that is influenced by the postcursor data bits to achieve a desired equalization of the communication channel coupled to the output node 208, as described above. In this regard, the output data signal is not filtered by a precursor data bit. It should be noted that in the precursor bypass mode, the latency associated with the output of the first delay element 212 (e.g., the latency of a signal at the output of the first delay element 212 with respect to that signal being provided at input node 210) is less than the latency associated with the output of the second delay element 214 (e.g., the latency of a signal at the output of the second delay element 214 with respect to that signal being provided at input node 210), such that the overall latency of the transmitter circuitry 200 is reduced in the precursor bypass mode. For the illustrated embodiment, the latency of the transmitter circuitry 200 is reduced by one period of the clock signal at node 220. However, it should be noted that other embodiments of the transmitter circuitry 200 may include additional delay elements for providing additional precursor data bits, and in such embodiments, the latency of transmitter circuitry 200 would be reduced by an even greater amount in the precursor bypass mode.

In another operating mode, alternatively referred to herein as the postcursor bypass mode, the transmitter controller 116 provides signals to the transmitter circuitry 200 to disable the use of one or more postcursor bits when generating the output data signal at node 208. For example, in some embodiments, the receiver 120 may include equalization capabilities that are capable of more effectively utilizing the previously received data bit(s) (e.g., the postcursor bits) to equalize the signal and achieve desired performance metric(s) at the input of the receiver 120. In other embodiments, one or more of the postcursor bits may not be utilized in the particular protocol being utilized to communicate over the serial interface 106. Thus, the receiver controller 130 and/or processing system 108 may signal the transmitter controller 116 to implement the postcursor bypass mode when the receiver 120 includes an equalizer or the communication protocol does not require the use of postcursor data bits. In other embodiments, the transmitter controller 116 may implement the postcursor bypass mode in response to identifying or otherwise detecting that a distortion metric for the serial interface 106 is less than a threshold value (or another performance metric satisfies a particular threshold value). To implement the postcursor bypass mode (e.g., in response to a signal from the receiver controller 130 and/or processing system 108 or in response to determining a performance metric for the serial interface 106 is satisfied), the transmitter controller 116 sets the gain of variable gain amplifier arrangement 234 and/or variable gain amplifier arrangement 236 to zero and provides a logical low (or logic '0') signal to an input of logic gate 242 and/or logic gate 244 to disable the first postcursor bit and/or second postcursor bit (e.g., by producing a logical low voltage at driver input node 226 and/or driver input node 228). Thus, the output data signal is not filtered by the first postcursor bit and/or second postcursor bit and the variable gain amplifier arrangement 234 and/or variable gain amplifier arrangement 236 are effectively disabled, thereby reducing the power consumed by the driver circuitry 206.

In yet another operating mode, alternatively referred to herein as a cursor bypass mode, the precursor bypass mode is combined with the postcursor bypass mode to disable variable gain amplifier arrangements 232, 234, 236 while providing the main data bit from the output of the first delay element 212 to the main data bit node 222 of the driver circuitry 206 to generate the output signal at node 208. For example, in response to identifying or otherwise detecting that a distortion metric (or another performance metric) for the serial interface 106 is less than a threshold value, the transmitter controller 116 may provide logical low signals to the inputs of AND logic gates 240, 242, 244 and configured multiplexers 246, 252 to provide the output of the first delay element 212 to node 222. In the cursor bypass mode, the power consumed by the driver circuitry 206 is reduced by effectively disabling variable gain amplifier arrangements 232, 234, 236 while latency of the transmitter circuitry 200 is reduced by bypassing the second delay element 214 to obtain the main data bit. In this regard, the output data signal is unfiltered, that is, the main data bit at driver input node 222 is not filtered by precursor and/or postcursor data bits. In other embodiments, the receiver controller 130 and/or processing system 108 may signal the transmitter controller 116 to implement the cursor bypass mode when the receiver 120 includes equalization capabilities that achieve desired performance metric(s) at the input of the receiver 120 or when the cursor bits are not utilized by the protocol being utilized to communicate over the serial interface 106.

In yet another operating mode, alternatively referred to herein as a clockless buffer mode, the transmitter controller 116 provides signals to the transmitter circuitry 200 to bypass the serialized delay arrangement 202 to obtain the main data bit and disable the use of the precursor and postcursor bits when generating the output data signal at node 208. For example, the clockless buffer mode may be utilized to transmit lower frequency serial data (e.g., debug or test data) asynchronously over the serial interface 106. In this regard, the processing system 108 may signal the transmitter controller 116 to implement the clockless buffer mode, or the transmitter controller 116 may access and/or monitor a control status register that may indicate that the clockless buffer mode should be implemented. To implement the clockless buffer mode, the transmitter controller 116 configures the multiplexer 252 to select an input of the multiplexer that is coupled to a node 260 configured to receive the asynchronous data (e.g., the debug or test data) intended to be transmitted in the clockless buffer mode. In this regard, the asynchronous data at node 260 constitutes the main data bit and is provided directly to the driver input node 222 without having to propagate through any delay elements and/or serialized delay arrangement 202. The driver circuitry 206 generates the output signal at node 208 that is representative of the asynchronous data at node 260, in a similar manner as described above. In this manner, the latency of the transmitter circuitry 200 is reduced by generating the output signal at node 208 based on the asynchronous data at node 260 without passing the asynchronous data through any delay elements. In other words, the transmitter circuitry 200 functions as a clockless buffer with respect to the asynchronous data being transmitted over the serial interface 106. Additionally, in some embodiments, depending on characteristics of the communication channel coupled to output node 208, the transmitter controller 116 may also provide logical low signals to the inputs of AND logic gates 240, 242, 244 to reduce the power consumed by the driver circuitry 206 in the clockless buffer mode.

Figure 3:
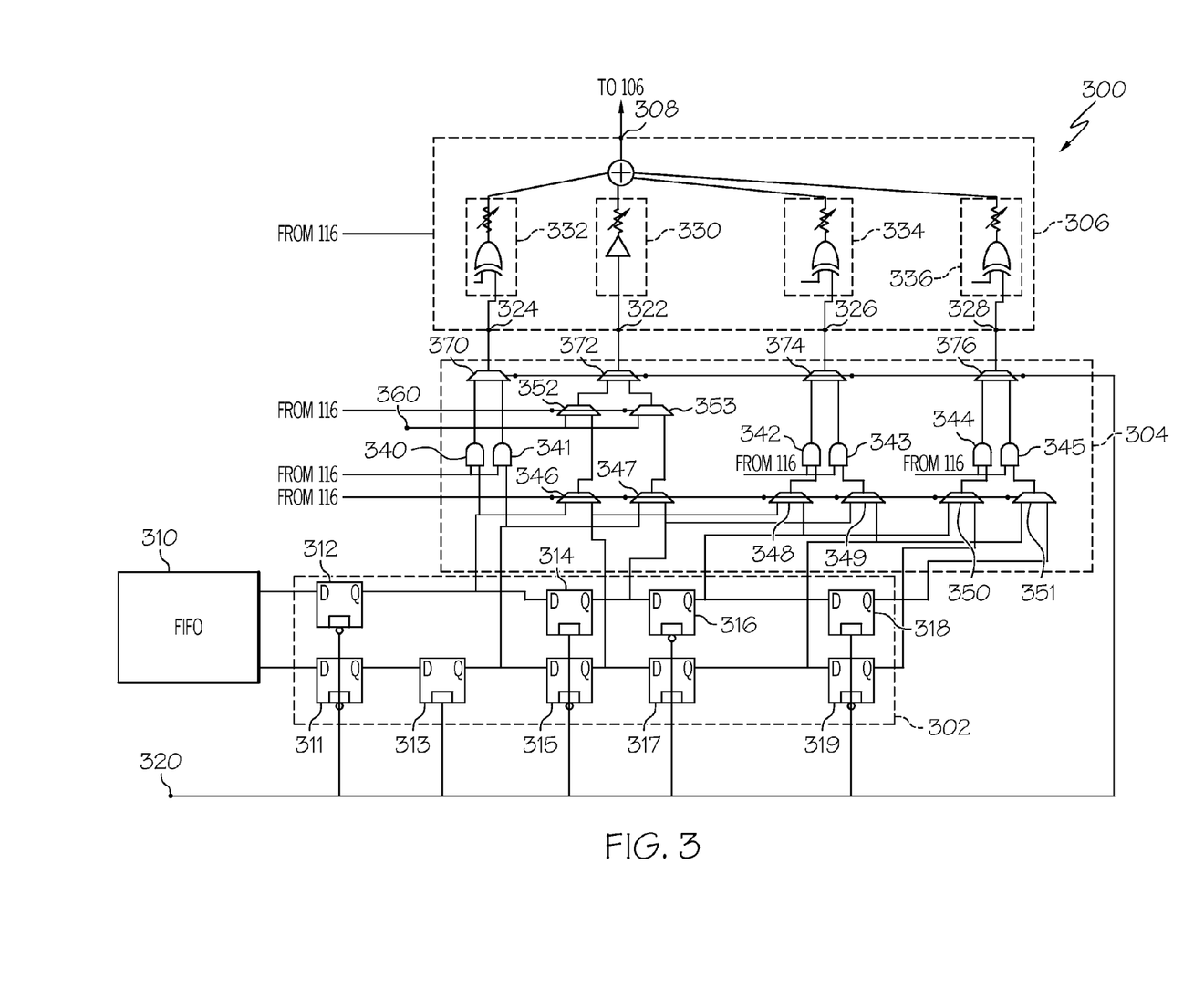
FIG. 3 is a schematic view of transmitter circuitry suitable for use in the system of FIG. 1 in accordance with another embodiment.

FIG. 3 depicts another exemplary embodiment of transmitter circuitry 300 suitable for use as transmitter 114 in the first computing module 102 of FIG. 1. The illustrated embodiment of the transmitter circuitry 300 includes, without limitation, a serialized delay arrangement 302, bypass logic 304, and driver circuitry 306. The illustrated embodiment of transmitter circuitry 300 corresponds to a half-rate architecture implementation of the transmitter circuitry 200 of FIG. 2. In this regard, the elements of transmitter circuitry 300 are similar to their counterpart elements found in the transmitter circuitry 200 described above with reference to FIG. 2, and the features and/or functionality of these common elements will not be redundantly described in detail here in the context of transmitter circuitry 300.

The elements of the transmitter circuitry 300 are suitably configured to produce an output data signal at an output node 308 that corresponds to a bit of serialized data received at an input of the serialized delay arrangement 302. For the half-rate architecture of FIG. 3, the serialized delay arrangement 302 is configured to receive 2-bit serialized data, wherein the output data signal at the output node 308 is representative of one bit of the 2-bits on the rising edge of the half rate clock signal at node 320 and the output data signal is representative of the other bit of the 2-bits on the falling edge of the half rate clock signal, as described in greater detail below. In this regard, when the transmitter circuitry 300 is utilized as the transmitter 114 in the first computing module 102 of FIG. 1, the parallel-to-serial conversion circuitry 110 includes a FIFO (first in, first out) block 310 configured to provide two bits of the parallel data from the processing system 108 on each rising edge of the half-rate clock signal at node 320, as described in greater detail below.

In the illustrated embodiment, the serialized delay arrangement 302 comprises a first plurality of serialized delay elements 312, 314, 316, 318 configured to delay a first stream of serialized data from the FIFO 310 and a second plurality of serialized delay elements 311, 313, 315, 317, 319 configured to delay a second stream of serialized data from the FIFO 310. Delay elements 311, 312, 315, 316 and 319 are clocked on the falling edges of the half-rate clock signal at node 320 while delay elements 313, 314, 317, 318 are clocked on the rising edges of the half-rate clock signal.

In an exemplary embodiment, the driver circuitry 306 is configured as a 4-bit FIR filter that generates the output data signal at output node 308 in a manner that is influenced by signals at driver input nodes 322, 324, 326, 328. The first driver input node 322 is configured to receive the main data bit, the second driver input node 324 is configured to receive the precursor data bit, and the third and fourth driver input nodes 326, 328 are configured to receive a respective postcursor data bit. The driver circuitry 306 includes variable gain amplifier arrangements 330, 332, 334, 336 coupled between a respective driver input node 322, 324, 326, 328 and the output node 308. As illustrated, the variable gain amplifier arrangements 332, 334, 336 for the precursor and/or postcursor data bits are realized using an exclusive- or (XOR) logic gate to control the sign of the respective precursor and/or postcursor data bits, wherein an input of the respective XOR logic gate is coupled to the transmitter controller 116 to allow the transmitter controller 116 to control whether the output of a respective XOR logic gate is added or subtracted at the output node 308 to achieve the desired equalization of the communication channel (e.g., serial interface 106) coupled to the output node 308. As described above, the gain (or strength) of the variable gain amplifier arrangements 330, 332, 334, 336 may be adjusted independently, for example, by adjusting the resistance of one or more variable resistance elements of a respective variable gain amplifier arrangement 330, 332, 334, 336.

In an exemplary embodiment, the bypass logic 304 is coupled between the outputs of the delay elements of the serialized delay arrangement 302 and the driver input nodes 322, 324, 326, 328 and selectively provides one or more of the precursor data bit, the postcursor data bits and/or main data bit to the driver circuitry 306 during operation of the transmitter circuitry 300. The bypass logic 304 includes logic gates 340, 341, 342, 343, 344, 345 for enabling and/or disabling a respective precursor data bit and/or postcursor data bit. The bypass logic 304 also includes an array of multiplexers 346, 347, 348, 349, 350, 351 for selectively bypassing one or more delay elements of the serialized delay arrangement 302. In accordance with one embodiment, the bypass logic 304 also includes an array of multiplexers 352, 353 configured to bypass the serialized delay arrangement 302 to provide the main data bit to the driver input node 322, as described in greater detail below. The bypass logic 304 includes a final array of multiplexers 370, 372, 374, 376 that precede the driver input nodes 322, 324, 326, 328. The selection inputs of the multiplexers 370, 372, 374, 376 are coupled to the clock node 320 such that the outputs of the multiplexers 370, 372, 374, 376 are controlled by the half-rate clock signal at node 320 to synchronously provide the appropriate main data bit, precursor bit and/or postcursor bits to the driver circuitry 306 on rising and/or falling edges of the half rate clock signal. In this regard, the multiplexers 370, 372, 374, 376 act as retiming elements that ensure the appropriate signals are provided to the driver input nodes 322, 324, 326, 328 in sync with a rising and/or falling edge of the half-rate clock signal.

Referring now to FIGS. 1 and 3, in an exemplary embodiment, in a normal operating mode, the bypass logic 304 provides the main data bit, the precursor data bit, and the postcursor data bits to the driver circuitry 306 for generating an output data signal representative of the main data bit that equalizes the communication channel at the output node 308. In this regard, on rising edges of the half-rate clock signal at node 320, the transmitter controller 116 provides signals to control the multiplexers 346, 348, 350, 352, such that mutliplexers 346 and 352 provide the output of delay element 315 (e.g., the main data bit) to an input of multiplexer 372, mutliplexer 348 provides the output of delay element 316 (e.g., the first postcursor data bit) to an input of AND logic gate 342, and mutliplexer 350 provides the output of delay element 319 (e.g., the second postcursor data bit) to an input of AND logic gate 344. The transmitter controller 116 also provides logical high signals to the other inputs of the AND logic gates 340, 342, 344 to provide the precursor bit and postcursor bits to the multiplexers 370, 374, 376. The half-rate clock signal controls the multiplexers 370, 372, 374, 376 such that on the rising edge of the half-rate clock signal, the output of delay element 312 (e.g., the precursor data bit) is provided to driver input node 324, the output of delay element 315 is provided to driver input node 322, the output of delay element 316 is provided to driver input node 326, and the output of delay element 319 is provided to driver input node 328. As described above, the driver circuitry 306 generates the output data signal at the output node 308 representative of the main data bit (e.g., the output of the delay element 315) in a manner that is influenced by the precursor data bit and postcursor data bits to achieve a desired equalization of the communication channel coupled to the output node 308, as described above.

On falling edges of the half-rate clock signal at node 320, the transmitter controller 116 provides signals to control the multiplexers 347, 349, 351, 353, such that mutliplexers 347 and 353 provide the output of delay element 314 (e.g., the main data bit) to an input of multiplexer 372, mutliplexer 349 provides the output of delay element 317 (e.g., the first postcursor data bit) to an input of AND logic gate 343, and mutliplexer 351 provides the output of delay element 318 (e.g., the second postcursor data bit) to an input of AND logic gate 345. The transmitter controller 116 also provides logical high signals to the other inputs of the AND logic gates 341, 343, 345 to provide the precursor bit and postcursor bits to the multiplexers 370, 374, 376. The half-rate clock signal controls the multiplexers 370, 372, 374, 376 such that on the falling edge of the half-rate clock signal, the output of delay element 313 (e.g., the precursor data bit) is provided to driver input node 324, the output of delay element 314 is provided to driver input node 322, the output of delay element 317 is provided to driver input node 326, and the output of delay element 318 is provided to driver input node 328. As described above, the driver circuitry 306 generates the output data signal at the output node 308 representative of the main data bit (e.g., the output of the delay element 314) in a manner that is influenced by the precursor data bit and postcursor data bits to achieve a desired equalization of the communication channel coupled to the output node 308, as described above.

In an exemplary embodiment, in the precursor bypass mode, the transmitter controller 116 provides signals to the transmitter circuitry 300 to disable the use of the precursor bit when generating the output data signal at node 308. In the precursor bypass mode, the transmitter controller 116 provides signals to control the multiplexers 346, 347, 348, 349, 350, 351, 352, 353, such that mutliplexers 346 and 352 provide the output of delay element 312 to an input of multiplexer 372, multiplexers 347 and 353 provide the output of delay element 313 to a second input of multiplexer 372, mutliplexer 348 provides the output of delay element 315 to an input of AND logic gate 342, multiplexer 349 provides the output of delay element 314 to an input of AND logic gate 343, multiplexer 350 provides the output of delay element 316 to an input of AND logic gate 344, and multiplexer 351 provides the output of delay element 317 to an input of AND logic gate 345. The transmitter controller 116 also provides a logical low signals to the inputs of AND logic gates 340, 341 to disable the precursor bits at node 324. In this manner, the output of delay element 312 corresponds to the main data bit on rising edges of the half-rate clock signal and the output of delay element 313 corresponds to the main data bit on falling edges of the half-rate clock signal. Thus, in the precursor bypass mode, the driver circuitry 306 generates the output data signal at the output node 308 representative of the main data bit in a manner that is influenced by the postcursor data bits to achieve a desired equalization of the communication channel coupled to the output node 308, as described above. It should be noted that in the precursor bypass mode, the latency associated with the output of the delay element 312 is less than the latency associated with the output of the delay element 315, and the latency associated with the output of the delay element 313 is less than the latency associated with the output of the delay element 314, such that the overall latency of the transmitter circuitry 200 is reduced in the precursor bypass mode. For the illustrated embodiment, the latency of the transmitter circuitry 300 is reduced by one half of the period of the half-rate clock signal at node 320 in the precursor bypass mode.

As described above, in the postcursor bypass mode, the transmitter controller 116 provides signals to the transmitter circuitry 300 to disable the use of one or more postcursor bits when generating the output data signal at node 308. For example, the transmitter controller 116 may provide a logical low signal to the inputs of one or more of AND logic gates 342, 343, 344, 345 to disable the first postcursor bit and/or second postcursor bit, for example, by producing a logical low voltage at driver input node 326 and/or driver input node 328. In the cursor bypass mode, the precursor bypass mode is combined with the postcursor bypass mode to disable variable gain amplifier arrangements 332, 334, 336 while providing the main data bit from the output of delay element 312 or delay element 313 to the main data bit input node 322 of the driver circuitry 306 to generate the output signal at node 308.

In the clockless buffer mode, the transmitter controller 116 provides signals to the transmitter circuitry 300 to bypass the serialized delay arrangement 302 to obtain the main data bit and disable the use of the precursor and postcursor bits when generating the output data signal at node 308. For example, the transmitter controller 116 may configure the multiplexers 352, 353 to select the input of the respective multiplexer 352, 353 that is coupled to a node 360 configured to receive the asynchronous data intended to be transmitted during the clockless buffer mode. Additionally, the transmitter controller 116 is configured to disable operation of the multiplexer 372 (e.g., by temporarily disabling the half-rate clock signal at node 320 from being provided to the selection inputs of multiplexers 372), such that the output of one of the multiplexers 352, 353 is provided directly to the driver input node 322 via multiplexer 372. In this regard, the asynchronous data at node 360 constitutes the main data bit and is provided directly to the driver input node 322 without having to propagate through any delay elements and/or serialized delay arrangement 302. The driver circuitry 306 generates the output signal at node 308 that is representative of the asynchronous data at node 360, in a similar manner as described above. In this manner, the latency of the transmitter circuitry 300 is reduced by generating the output signal at node 308 based on the asynchronous data at node 360 without passing the asynchronous data through any delay elements. Additionally, in some embodiments, depending on characteristics of the communication channel coupled to output node 308, the transmitter controller 116 may also provide logical low signals to the inputs of AND logic gates 340, 341, 342, 343, 344, 345 to reduce the power consumed by the driver circuitry 306 in the clockless buffer mode. In this regard, the transmitter controller 116 may also disable operation of the multiplexers 370, 374, 376 in a similar manner as done for multiplexer 372.

Still referring to FIGS. 1 and 3, as described above, when the transmitter circuitry 300 is utilized as the transmitter 114 of the first computing module 102, the parallel-to-serial conversion circuitry 110 includes or otherwise implements a FIFO 310 configured to provide two bits of the parallel data from the processing system 108 on each rising edge of the half-rate clock signal at node 320. The FIFO 310 transfers data bits from the clock domain of the processing system 108 to the clock domain of the transmitter 114, 300. In an exemplary embodiment, the FIFO 310 uses the full-rate clock signal to provide finer resolution and reduce the offset between read/write pointers of the FIFO 310 to reliably transfers data bits from the clock domain of the processing system 108 to the half-rate clock domain of the transmitter 114, 300 with reduced latency.

To briefly summarize, one advantage of the apparatus, systems and methods described herein is that the FIR equalization transmitter is capable of reducing its associated latency and power consumption when performance metrics and/or characteristics of the serial interface allow. For example, when the bit error rate is sufficiently low or the received signal quality is sufficiently high, delay elements of the FIR transmitter are selectively bypassed to reduce the latency of the transmitter. In this regard, the transmitter may initially generate an equalized output signal on an edge (e.g., a rising or falling edge) of a clock signal representative of a bit of serial data by filtering the bit in a manner that is influenced by the succeeding bit of the serial data (e.g., the precursor data bit). In response to identifying a performance metric for the interface satisfies a threshold criterion for implementing the precursor bypass mode, the transmitter may generate a subsequent output signal representative of a subsequent bit of the serial data on a subsequent edge of the clock signal, wherein the subsequent output signal is not filtered by its succeeding bit of the serial data and one or more delay elements of the transmitter are bypassed to reduce latency. Additionally, filtering elements (e.g., variable gain amplifiers) associated with bits used to filter the output data signal may be effectively disabled to reduce power consumed by the transmitter and reduce noise at the output of the transmitter when filtering using these bits is not needed to achieve sufficient performance metrics for the serial interface. The postcursor and/or precursor data bits may also be disabled and/or bypassed to prevent over equalization of the output signal when the receiver includes an equalizer capable of achieving desired performance metric(s) for the particular implementation.

For the sake of brevity, conventional techniques related to FIR filters and/or digital filters, serial communications, parallel-to-serial and/or serial-to-parallel conversion, circuit design, signaling, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used in the foregoing description for the purpose of reference only, and thus are not intended to be limiting, and the terms "first", "second" and other such numerical terms referring to structures do not imply a sequence or order unless clearly indicated by the context.

The foregoing description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the figures may depict one exemplary arrangement of elements, additional intervening elements, devices, features, or components may be present in an embodiment of the depicted subject matter. As used herein, a "node" means any internal or external reference point, connection point, junction, signal line, conductive element, or the like, at which a given signal, logic level, voltage, data pattern, current, or quantity is present.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient and edifying road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A transmitter comprising:
   a plurality of delay elements configured to delay serialized data, resulting in delayed serialized data, the plurality of delay elements including a first delay element and a second delay element having an input coupled to an output of the first delay element;
   driver circuitry including a finite impulse response filter configured to generate an output signal, the output signal being representative of a first bit of the delayed serialized data at a first driver input node; and
   bypass logic coupled to the output of the first delay element, an output of the second delay element, and the driver circuitry to provide the first bit of the delayed serialized data to the first driver input node, the bypass logic being configured to selectively bypass the second delay element to provide the first bit of the delayed serialized data from the output of the first delay element to the first driver input node.

2. The transmitter of claim 1, wherein:
   the driver circuitry is configured to transmit the output signal over a serial interface; and
   the bypass logic is configured to bypass the second delay element in response to determining a performance metric of the serial interface satisfies a threshold criterion.

3. The transmitter of claim 1, the bypass logic being configured to provide the output of the second delay element to the driver input node such that the driver circuitry generates the output signal based on the output of the second delay element, wherein:
   an input of the first delay element is coupled to an input node configured to receive the serialized data; and
   the bypass logic is configured to selectively bypass the second delay element by providing the output of the first delay element to the driver input node, wherein the driver circuitry generates the output signal based on the output of the first delay element.

4. The transmitter of claim 3, wherein:
   an input of a third delay element of the plurality of delay elements is coupled to the output of the second delay element;
   the bypass logic is configured to provide an output of the third delay element to a second driver input node the driver circuitry, the driver circuitry being configured to equalize the output signal with the output of the third delay element at the second driver input node; and
   the bypass logic is configured to selectively bypass the third delay element by providing the output of the second delay element to the second driver input node while providing the output of the first delay element to the driver input node, wherein the driver circuitry equalizes the output signal with the output of the second delay element.

5. The transmitter of claim 1, the driver circuitry being configured to equalize the output signal with the output of the first delay element at the second driver input node, wherein the bypass logic is configured to disable the output of the first delay element at the second driver input node while selectively bypassing the second delay element to provide the output of the first delay element to the driver input node.

6. The transmitter of claim 1, wherein latency associated with the second delay element is less than latency associated with the first delay element.

7. A computing module comprising:
   a processing system; and
   a finite impulse response (FIR) transmitter coupled to the processing system for transmitting an output signal representative of a main bit of data from the processing system over a serial interface, wherein the FIR transmitter is configured to selectively equalize the output signal using a second bit of the data, the FIR transmitter including:
      a delay arrangement including a first delay element and a second delay element configured to delay the data to obtain a first bit at an output of the second delay element and the second bit at an output of the first delay element, an input of the second delay element being coupled to the output of the first delay element;
      driver circuitry configured to generate the output signal by filtering the main bit at a first driver input node of the driver circuitry in response to the second bit at a second driver input node of the driver circuitry in a first operating mode to equalize the output signal; and
      bypass logic coupled between the delay arrangement and the driver circuitry, the bypass logic being configured to:

provide the second bit from the output of the first delay element to the second driver input node and the first bit from the output of the second delay element to the first driver input node in the first operating mode; and provide the second bit from the output of the first delay element to the first driver input node in a second operating mode.

8. The computing module of claim 7, further comprising a controller coupled to the FIR transmitter, wherein the controller is configured to control the bypass logic such that the bypass logic fails to provide the second bit to the second driver input node of the driver circuitry when a performance metric for the serial interface satisfies a threshold criterion.

9. The computing module of claim 7, further comprising a controller coupled to the FIR transmitter, wherein the controller is configured to control the bypass logic such that the bypass logic provides the second bit to the second driver input node of the driver circuitry to equalize the output signal in response to the second bit when a performance metric for the serial interface fails to satisfy a threshold criterion.

10. The computing module of claim 7, wherein the bypass logic is configured to provide asynchronous data to the first driver input node in a third operating mode.

11. The computing module of claim 7, wherein the bypass logic is configured to disable the output of the first delay element at the second driver input node in the second operating mode.

12. A method for generating output signals representative of bits of serial data, the method comprising:

generating an equalized output signal representative of a first bit of the serial data at an output node by filtering the first bit from an output of a second delay element and a second bit of the serial data from an output of a first delay element, the second bit following the first bit, wherein an input of the second delay element is coupled to the output of the first delay element; and generating a second output signal representative of a third bit from the output of the first delay element at the output node, wherein the second output signal is not filtered by a fourth bit of the serial data when a performance metric for an interface coupled to the output node satisfies a threshold criterion, the fourth bit following the third bit.

13. The method of claim 12, further comprising:

determining whether the performance metric for a serial interface coupled to the output node satisfies the threshold criterion, wherein the second output signal is not filtered by the fourth bit in response to determining the performance metric satisfies the threshold criterion; and generating a second equalized output signal representative of the third bit at the output node by filtering the third bit from the output of the second delay element and the fourth bit from the output of the first delay element in response to determining the performance metric fails to satisfy the threshold criterion.

14. The method of claim 12, further comprising:

bypassing the second delay element to obtain the third bit when the performance metric satisfies the threshold criterion.

\* \* \* \* \*